US012763030B1

(12) United States Patent
Tang et al.

(10) Patent No.: US 12,763,030 B1
(45) Date of Patent: Oct. 13, 2026

(54) DISPLAY CONFIGURATION FOR REFRESH RATE CONTROL

(71) Applicant: Microsoft Technology Licensing, LLC, Redmond, WA (US)

(72) Inventors: Yichen Tang, Redmond, WA (US); Hyungsoo Kim, Bellevue, WA (US); Ying Zheng, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/212,478

(22) Filed: May 19, 2025

(51) Int. Cl.
*G09G 3/3266* (2016.01)
*G09G 3/3275* (2016.01)
*G09G 3/36* (2006.01)

(52) U.S. Cl.
CPC ......... *G09G 3/3266* (2013.01); *G09G 3/3275* (2013.01); *G09G 3/3677* (2013.01); *G09G 3/3688* (2013.01); *G09G 2310/0245* (2013.01); *G09G 2310/0289* (2013.01); *G09G 2310/0291* (2013.01); *G09G 2310/08* (2013.01); *G09G 2330/021* (2013.01)

(58) Field of Classification Search
CPC .................................................... G09G 3/3266
See application file for complete search history.

(56) References Cited

U.S. PATENT DOCUMENTS

2015/0269897 A1* 9/2015 Kitsomboonloha ........................ G06F 3/04166 345/87
2019/0087144 A1 3/2019 Yadav
2021/0035488 A1* 2/2021 Seo ........................ G09G 3/325
2022/0165228 A1 5/2022 Liu
2022/0189408 A1* 6/2022 Jo ........................ G09G 3/3275

FOREIGN PATENT DOCUMENTS

CN 206470737 U 9/2017
CN 118860157 A 10/2024
CN 119360766 A 1/2025
CN 119479578 A 2/2025
WO 2024037465 A1 2/2024
WO 2024125527 A1 6/2024

OTHER PUBLICATIONS

Extended European Search Report Received for Application No. 26176583.8, Mailed on May 29, 2026, 14 Pages.

* cited by examiner

*Primary Examiner* — Amr A Awad
(74) *Attorney, Agent, or Firm* — Alleman Hall LLP

(57) ABSTRACT

A display device includes a plurality of image-forming elements arranged in a grid, including a plurality of rows and columns. A gate integrated circuit (IC) outputs a clock signal. A gate output buffer controls whether the clock signal is received by image-forming elements in a corresponding one or more rows. A source IC outputs data signals to control the plurality of image-forming elements. A block selection component controls, via a block selection signal, whether image-forming elements in a corresponding one or more columns are refreshed based at least in part on the data signals. A timing controller controls the output enable signal and the block selection signal to thereby control refresh rates for the plurality of image-forming elements, such that a first display region is refreshed at a first refresh rate, and a second display region is refreshed at a second refresh rate.

20 Claims, 10 Drawing Sheets

DISPLAY CONFIGURATION FOR REFRESH RATE CONTROL

BACKGROUND

Digital displays may use a plurality of image-forming elements (e.g., pixels) to output a visual representation of computer data. The state of the image-forming elements may be updated at a fixed or variable refresh rate.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A display device includes a plurality of image-forming elements arranged in a grid, including a plurality of rows and columns. A gate integrated circuit (IC) outputs a clock signal. A gate output buffer controls, based at least in part on an output enable signal, whether the clock signal is received by image-forming elements in a corresponding one or more rows. A source IC outputs data signals to control the plurality of image-forming elements. A block selection component controls, via a block selection signal, whether image-forming elements in a corresponding one or more columns are refreshed based at least in part on the data signals. A timing controller controls the output enable signal and the block selection signal to thereby control refresh rates for the plurality of image-forming elements, such that a first display region is refreshed at a first refresh rate, and a second display region is refreshed at a second refresh rate.

DETAILED DESCRIPTION

Figure 1:
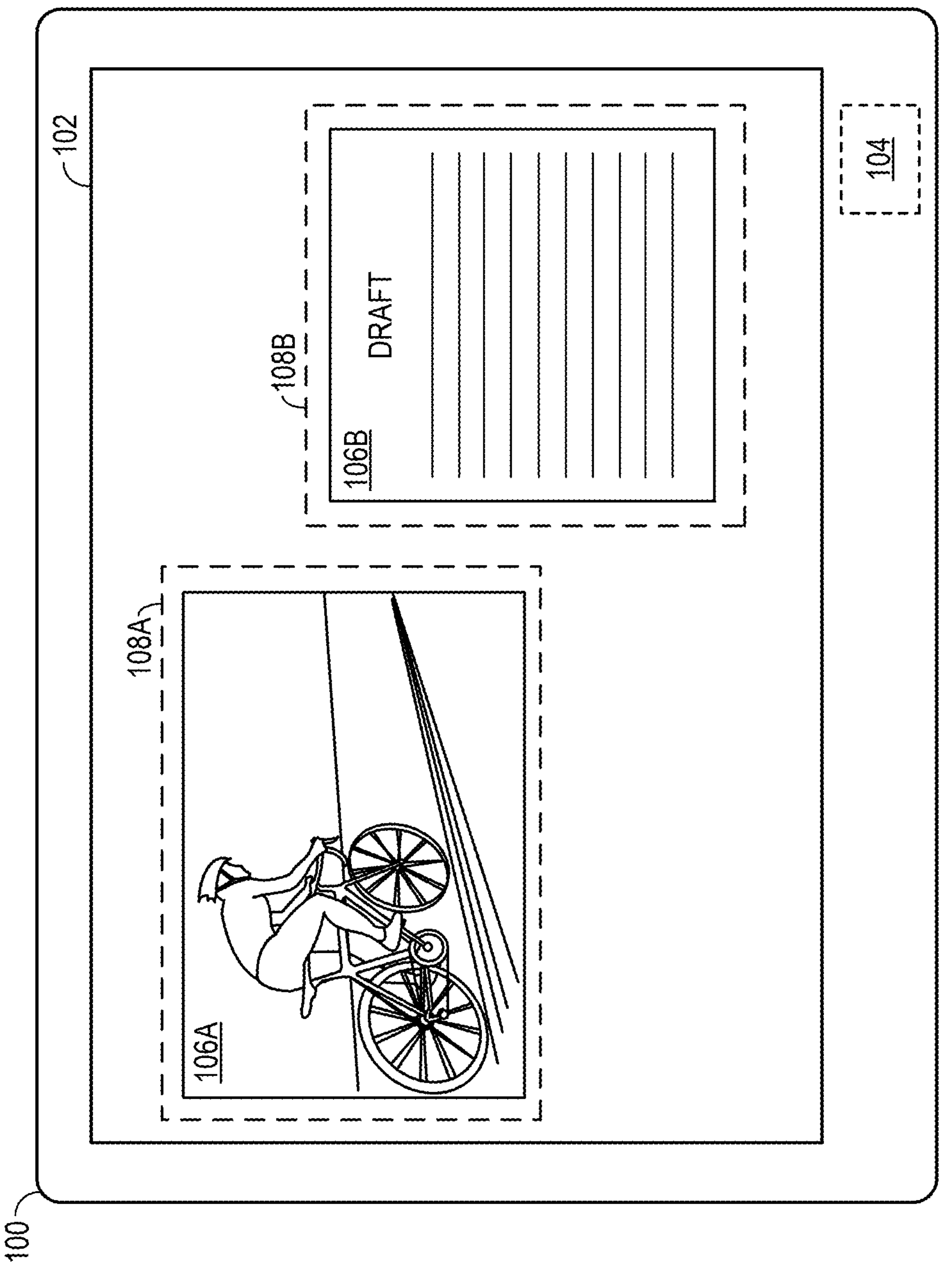
FIG. 1 schematically depicts an example display device, including two display regions updated at different refresh rates.

In typical display configurations, image content is presented by sequentially addressing rows of image-forming elements, such as pixels or sub-pixels, across the display area. The display is generally refreshed on a frame-by-frame basis, such that each row of image-forming elements is scanned and updated during every frame cycle. This sequential row-driving scheme ensures that the entire pixel array receives updated signals in a deterministic and temporally coordinated manner.

However, situations may arise in which only a portion of the image content changes from one frame to another. In such scenarios, the conventional update process continues to scan and refresh every row across the full display area. As a result, rows corresponding to unchanged content are nonetheless driven with new signals during each frame, consuming power unnecessarily. This approach can lead to substantial inefficiencies, particularly in battery-powered devices where display power consumption represents a significant portion of the overall energy budget.

Accordingly, the present disclosure is directed to example arrangements for image-forming circuitry of a display device, which can be controlled to establish two or more different display regions that are updated at different refresh rates. Briefly, the display device includes a plurality of image-forming components (e.g., pixels, sub-pixels) arranged in a grid. A gate integrated circuit (IC) outputs clock signals sequentially row-by-row, such that each row of image-forming elements becomes temporarily active when it receives the clock signal. A source IC outputs data signals to respective columns of the display, where each data signal conveys information corresponding to a desired image value. When a particular row is active, the image-forming elements in that row sample the data signals from their corresponding columns. This causes each image-forming element to be driven to a particular electrical state, such as a specific voltage or current level, thereby determining the output optical characteristics of that image-forming element.

The display device includes at least one output buffer operatively coupled with one or more rows of image-forming elements. According to the present disclosure, the output buffer may be controlled by an output enable signal, which determines whether the clock signal is output by the output buffer, and therefore determines whether the clock signal is received by the image-forming elements downstream of the output buffer. In some cases, each row has a corresponding output buffer, and each of these output buffers are independently controllable using the output enable signal. In this manner, by controlling the output buffers, one or more rows may be skipped during the row-by-row refresh process. As a result, image-forming elements in the corresponding rows do not receive the clock signal, and thus do not update their optical state.

Similarly, the display device includes at least one block selection component associated with one or more columns of a corresponding column group. The block selection component determines, based at least in part on the state of a block selection signal, whether image-forming elements in one or more corresponding columns are refreshed based at least in part on the data signals from the source IC. For instance, as will be described in more detail below, the block selection signal may be output by the block selection component on one or more additional circuit traces that extend throughout the grid of image-forming elements. Circuit elements of the digital display (such as one or more transistors) may be affected by the state of the block selection signal, and thereby control whether the image-forming elements in the one or more columns receive the data signals and/or clock signals.

In this manner, by controlling the output enable signal and the block selection signal, it is possible to control refresh rates for the plurality of image-forming components. This can enable, for instance, refreshing a first display region at a first display rate, and refreshing a second display region at a second display rate that is different from the first display rate. As a result, the refresh rates for different regions of a display can be updated based at least in part on how frequently the underlying image content changes. For portions of the display where the image changes rapidly (e.g., due to playback of a video), the corresponding image-forming elements can be refreshed frequently. By contrast, for portions of the display where the image changes infrequently (e.g., a static background image), then the corresponding image-forming elements can be refreshed less frequently. This provides the technical benefit of reducing power consumption of the display device. For instance, the battery life of a battery-powered computing device may be extended. Furthermore, these arrangements can improve user interaction with the computing system by accurately depicting image content that updates frequently, while still enabling power savings for other portions of the display that update less frequently.

FIG. 1 schematically depicts an example computing device 100, which includes a display device 102. In this example, the display device is an integral component of a larger computing device, which generates image content for presentation using the display device. In other examples, this need not be the case. For instance, the display device may be external to, and operatively coupled with, a separate computing device or other image source. These may include, as examples, a desktop or laptop computer, a mobile phone, a tablet, a wearable device, a set-top box, a gaming console, and/or any other system configured to output image content to a display. The image source may communicate with the display device using a suitable wired or wireless interface, and may provide image data in any suitable encoding format. In some examples, a display device as described herein may be implemented as, or in tandem with, computing system 1000 described below with respect to FIG. 10.

In the example of FIG. 1, computing device 100 includes a processing component 104, which generates image data for display by the display device. The processing component may take any suitable form, including but not limited to a central processing unit (CPU), graphics processing unit (GPU), application-specific integrated circuit (ASIC), system-on-chip (SoC), and/or any combination thereof. In some examples, the processing component may include dedicated image processing hardware. In other examples, image data may be generated by software executing on general-purpose processing circuitry. The image data generated by the processing component may represent static images, video content, graphical user interfaces, and/or other visual elements, and may be transmitted to the display device either directly or through an intermediate display controller or timing controller. In some examples, processing component 104 may be implemented as logic subsystem 1002 described below with respect to FIG. 10.

Similarly, the display device itself may be implemented in any suitable way. For instance, the display device may include a liquid crystal display (LCD), an organic light-emitting diode (OLED) display, a microLED display, and/or any other suitable type of panel technology capable of rendering visual content. The display device may include various supporting circuitry, such as gate driver integrated circuits (ICs), source driver ICs, timing controllers, backlight drivers, power management components, etc. The architecture of the display device may support various resolutions, refresh rates, color depths, etc., depending on the application context and performance requirements.

In the example of FIG. 1, the display device is used to present two different windows 106A and 106B including image content. Window 106A includes video content that is updating frequently. For instance, some to all of the image pixels of the video shown in window 106A may change from one frame to another. By contrast, window 106B includes a text document that updates less frequently—e.g., from one frame to another, few if any of the pixels in window 106B may change, depending on the user's interactions with the computing device. Accordingly, via the techniques described herein, different display regions 108A and 108B are established, corresponding to windows 106A and 106B. Image-forming elements of these display regions may be updated at different refresh rates based at least in part on the nature of the underlying image content. For instance, display region 108A may be updated at a first refresh rate, and display region 108B may be updated at a second, lower refresh rate. In this manner, pixels of region 108B consume less power as they are updated less frequently, which conserves electrical power of the computing device.

It will be understood that this specific scenario is non-limiting and highly simplified, and that a display device as described herein may be used to display any suitable type of imagery. The displayed imagery may in some cases fill substantially the entire display area, rather than being confined to two individual windows as shown in FIG. 1. Furthermore, image-forming elements falling outside display regions 108A and 108B may be updated at any suitable refresh rate. For instance, these image-forming elements may be refreshed at the same rate as those in display region 108A, as those in display region 108B, at a third refresh rate that differs from regions 108A and 108B, and/or may represent multiple additional display regions updated at multiple additional refresh rates.

Figure 2:
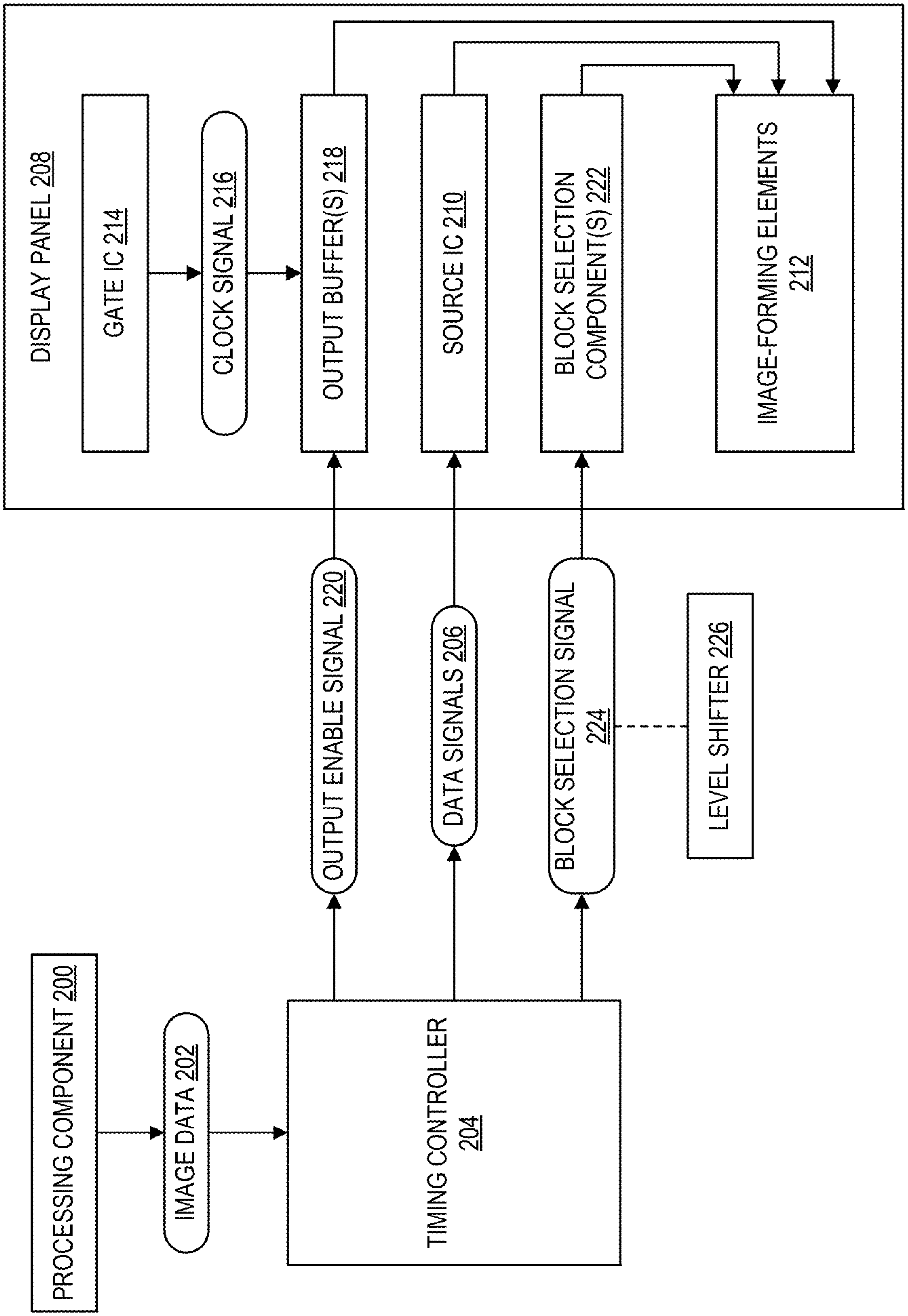
FIG. 2 schematically illustrates the use of a processing component and timing controller to output data signals used to control image-forming elements of a display device.

Aspects of the image generation and display driving process are schematically illustrated in more detail with respect to FIG. 2. Specifically, FIG. 2 schematically depicts an example processing component 200, which generates image data 202 and transmits the image data to a timing controller 204. The timing controller then outputs image data signals 206 to a display panel 208.

The timing controller may take any suitable form and may be configured to perform any suitable functions. Generally, the timing controller serves to translate the image data received from the processing component into a format suitable for controlling the hardware image-forming elements. For instance, the timing controller may be implemented using any suitable combination of computer hardware, firmware, and/or software. In some examples, the timing controller may further generate synchronization signals, such as vertical sync pulses and/or enable signals, which coordinate the actions of downstream driver circuits, as will be described in more detail below.

The image data 202 and image data signals 206 may be expressed and transmitted in any suitable way, depending on the specific configuration of the system. For example, the image data may be represented in digital form, such as in RGB, YCbCr, or other color space formats, and may be serialized or parallelized for transmission over high-speed interfaces. The image data signals may comprise analog voltage levels or digital codes, depending on whether the source driver performs digital-to-analog conversion internally. In either case, the signals correspond to target pixel states that determine the visual output of the display panel.

In this example, the data signals are received by a source integrated circuit (IC) 210 of the display panel 208. The source IC is operatively coupled with a plurality of image-forming elements 212 of the display device. The image-forming elements may take any suitable form. In general, the plurality of image-forming components are arranged as a grid, wherein the grid includes a plurality of rows and a plurality of columns. In some examples, the image-forming elements themselves may take the form of individual sub-pixels, such that multiple adjacent image-forming elements together comprise a pixel. Alternatively, in some examples, the image-forming elements may be implemented as pixels. Furthermore, as discussed above, the display device may use any suitable underlying technology or architecture for forming imagery. For instance, in some examples, the plurality of image-forming elements are pixels of an LCD. Additionally, or alternatively, the plurality of image-forming elements may be implemented as pixels of an OLED display. In general, however, the image-forming elements may be implemented as part of any suitable active-matrix display, including any kind of light-emitting pixels and/or other image-forming elements.

In some examples, the source IC is electrically connected to a set of column lines that extend across the display panel, with each column line corresponding to a vertical series of image-forming elements. The source IC outputs the image data signals (e.g., received from timing controller 204) to thereby control the plurality of image-forming elements. More particularly, the source IC may selectively drive voltage or current signals onto the column lines based at least in part on the received data signals, thereby determining the electrical state of each image-forming element when that element is enabled by a corresponding clock signal. In some implementations, the source IC may include internal memory buffers, level shifters, digital-to-analog converters, etc., to assist in accurately delivering the appropriate signal levels to the panel.

Additionally, the display device includes a gate IC 214. This outputs a clock signal 216, which is buffered by one or more output buffers 218 and used to control the image-forming components 212. More particularly, the gate IC drives sequential clock signals along a set of row lines, each of which is associated with a horizontal row of image-forming elements. When a particular gate line is asserted, the transistors (or other switching elements) within the corresponding row become conductive, thereby enabling the image-forming elements in that row to receive the data signals currently present on their respective column lines. Once the image data has been written to the selected row, the clock signal is discontinued, and the row returns to a non-conductive state, typically holding the written value via a storage capacitor or similar charge-retaining structure.

Furthermore, as discussed above, the output buffers may be controlled to thereby determine whether corresponding rows of image-forming elements receive the clock signal from the gate IC. In the example of FIG. 2, output buffer 218 receives an output enable signal 220 from timing controller 204. As will be described in more detail below, based at least in part on the state of the output enable signal (e.g., whether the signal is active), the output buffer selectively outputs the clock signal to a corresponding row group of one or more rows of image-forming elements. In some examples, each row of image-forming elements has its own corresponding output buffer, and each of the output buffers are independently controllable using the output enable signal. In other words, the gate output buffer may be one of a plurality of gate output buffers, and the corresponding row group includes one row, such that each row of the plurality of rows is associated with a respective gate output buffer. In this manner, it is possible to selectively skip one or more rows of image-forming elements during the frame refresh cycle. This can beneficially facilitate power savings by reducing the frequency with which some of the image-forming elements are updated. Furthermore, this may be achieved without requiring modifications to the design of the shift register circuit, which enhances compatibility with existing display device hardware.

Similarly, in FIG. 2, display panel 208 additionally includes one or more block selection components 222. The block selection component is configured to control, via a block selection signal, whether image-forming elements in a corresponding column group including one or more columns are refreshed based at least in part on the data signals. In the example of FIG. 2, the timing controller additionally outputs a block selection signal 224, which is received by the block selection component. As will be described in more detail below, the block selection component may in some cases output the block selection signal on an additional trace that extends along one or more columns of image-forming elements. One or more circuit components (e.g., transistors) may be affected by the state of the block selection component and thereby determine whether image-forming elements of the columns are refreshed based at least in part on data signals 206 output by the source IC. In this manner, by controlling the output enable signal and block selection signal, timing controller 204 can influence refresh rates of image-forming elements across the display device.

The block selection component may be implemented using any suitable circuitry configured to receive the block selection signal from the timing controller and propagate its state to one or more image-forming elements along a column. For example, the block selection component may comprise a buffer, latch, or level shifter that conditions the block selection signal for distribution along the additional trace. Additionally, or alternatively, the block selection signal may be conditioned and/or amplified by one or more other components of the display device, such as a level shifter 226 configured to increase the voltage of the block selection signal. The block selection signal may originate from the timing controller, as is shown in FIG. 2, or may originate from another suitable signal generation component of the display device. In some implementations, the block selection component may include a driver circuit configured to replicate the incoming signal with appropriate voltage and drive strength for use within the display panel. The block selection component may also include logic to enable or disable propagation of the block selection signal based at least in part on additional control inputs or timing constraints, depending on the desired display update behavior. Use of the level shifter may facilitate reliable signal propagation across longer trace lengths by mitigating voltage drop and ensuring adequate logic level thresholds are met by downstream components. This beneficially improves timing accuracy and reduces the likelihood of signal degradation within the display panel.

Figure 3:
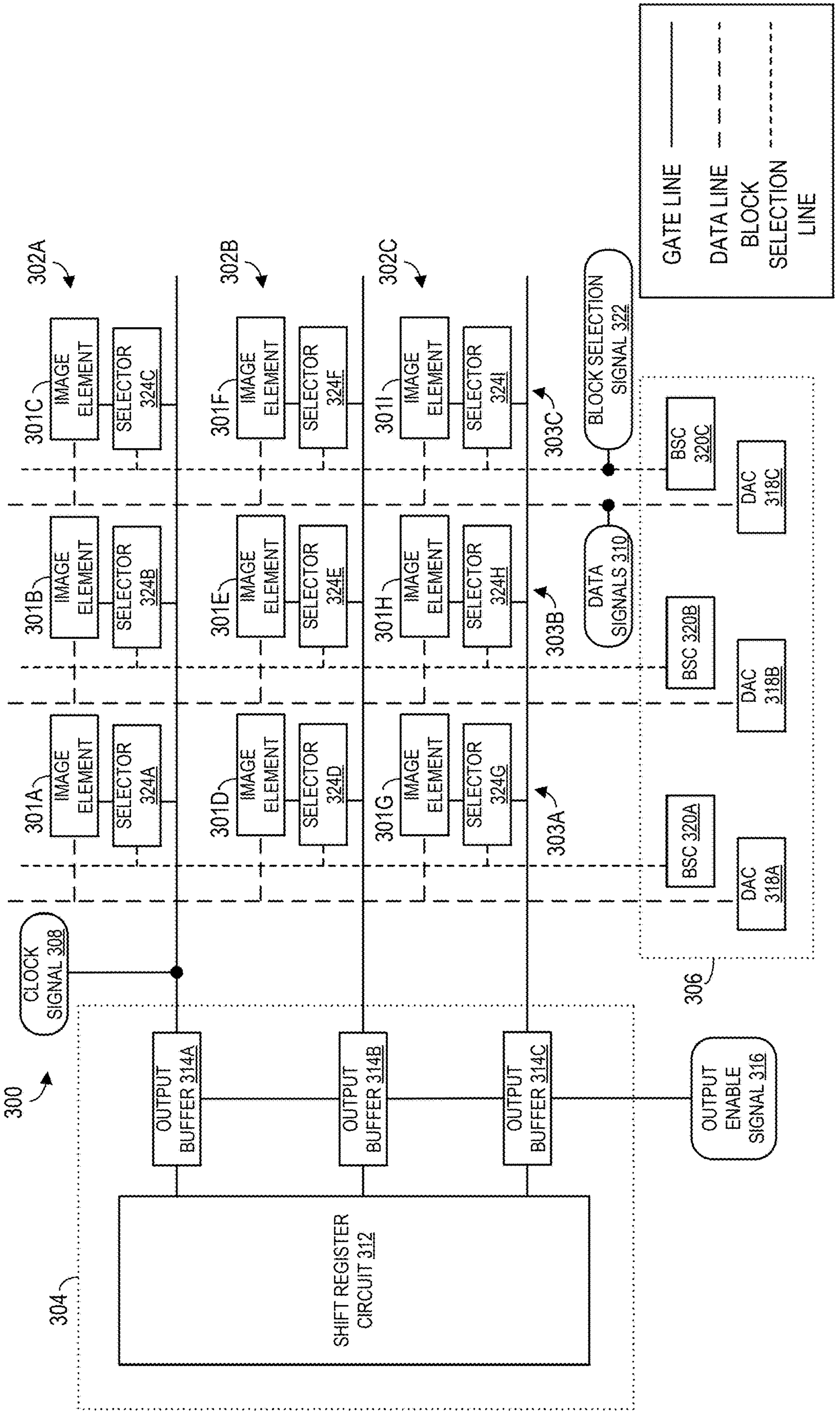
FIG. 3 schematically illustrates an example display device configuration including a plurality of image-forming elements arranged in a grid.

One example configuration for a display device will now be described in more detail with respect to FIG. 3. Specifically, FIG. 3 schematically depicts aspects of an example display device 300 including a plurality of image-forming elements 301A-301I. These are arranged in a grid including a plurality of rows 302A, 302B, and 302C, and columns 303A, 303B, and 303C. Additionally, display device 300 includes a gate IC 304 and a source IC 306. The gate IC outputs a clock signal 308 to each of the rows of image-forming elements. In this example, the display includes one gate line for each row of image-forming elements, although this may vary depending on the implementation. For instance, in OLED configurations, the display device may include two or more gate lines per row. The source IC outputs image data signals 310 to each of the columns of image-forming elements. As discussed above, when a given row receives the clock signal, data signals from the source IC are written to the image-forming elements of the row, thereby changing their output optical characteristics.

More particularly, in FIG. 3, the gate IC includes a shift register circuit 312 that is coupled with a plurality of output buffers 314A, 314B, and 314C. The shift register circuit is configured to receive timing information from the timing controller, and to sequentially assert clock signals across its outputs in accordance with the timing of the display refresh cycle. Each output of the shift register is connected to a corresponding output buffer, which in turn drives a respective gate line associated with a row of image-forming elements. In operation, the shift register steps through its outputs in a predetermined sequence, such that one row of image-forming elements is activated at a time, enabling the corresponding data signals to be written to that row before proceeding to the next. This sequential activation allows the display panel to be updated in a controlled and repeatable manner, supporting full-frame or partial-frame refreshes as dictated by the system's control logic. Furthermore, as discussed above, each of the output buffers are controllable based at least in part on the state of an output enable signal 316 received from the timing controller. In this manner, one or more rows of image-forming elements may be selectively skipped during each refresh cycle.

Furthermore, in the example of FIG. 3, the source IC includes a plurality of digital-to-analog converters (DACs) 318A, 318B, and 318C, respectively corresponding to the columns 303A, 303B, and 303C of image-forming elements. Each of the DACs outputs the image data signals 310 for its respective column. Furthermore, each column is additionally associated with a corresponding block selection component (BSC), including BSCs 320A, 320B, and 320C. In the example of FIG. 3, the display device includes a plurality of block selection components, each associated with one column, such that each column of the plurality of columns is associated with a respective block selection component. As will be described in more detail below, in other examples, the same block selection component may be used to control image-forming elements in two or more adjacent columns. Furthermore, in this example, the block selection components are sub-components of source IC 306. In other examples, the block selection components may additionally or alternatively be implemented by one or more circuit elements that are external to the source IC. A configuration such as this, where each column has its own associated block selection component, can improve the level of control over which specific image-forming elements are refreshed and at which rates—e.g., regions of differing refresh rate can beneficially be defined with more granularity. Furthermore, inclusion of the block selection components within the source IC may in some cases simplify manufacturing of the display device, enabling the source IC and block selection components to be installed together as a modular unit.

As shown, the block selection components output block selection signals 322 along additional block selection lines that run along each column of image-forming elements. These are received by selector components 324A-324I, each associated with a different respective image-forming element. The selector components may be implemented using any suitable combination of hardware circuit elements for controlling whether the image-forming element receives the clock and/or data signals based at least in part on the state of the block selection signal. For instance, in some examples, the selectors may be implemented using suitable configurations of transistors, such as thin-film transistors (TFTs).

In general, the selectors are configured such that their corresponding image-forming elements are only refreshed if both the clock and block selection signals are active. For instance, if the clock signal is active but the block selection signal is not active, then a selector may prevent its corresponding image-forming element from receiving the clock signal, and thereby prevent the image-forming element from refreshing. Similarly, if the block selection signal is active but the clock signal for that row is not active, then the image-forming elements are once again not refreshed. Non-limiting example configurations of hardware elements suitable for implementing the selector components will be illustrated and described below with respect to FIGS. 7 and 8.

In this manner, by controlling the output enable signal 316 and block selection signals 322, the timing controller of the display device can control the rates at which different image-forming elements are refreshed. For instance, in one example, image-forming element 310B may be refreshed more frequently than its adjacent image-forming elements 301A and 301C. Thus, during a particular refresh cycle, the corresponding output buffer 314A may be enabled and supply the clock signal 308 to row 302A. The block selection component 320B that corresponds to image-forming element 301B may output the block selection signal 322, which activates selector 324B and causes the image-forming element to be refreshed based at least in part on the data signals 310. However, the block selection components 320A and 320C may refrain from outputting the block selection signal, and thus selectors 324A and 324C may prevent their corresponding image-forming elements 301A and 301C from receiving the clock and/or data signals, thereby preventing the image-forming elements from updating during that refresh cycle. In this manner, image-forming element 301B is updated more frequently than image-forming elements 301A or 301C.

As another example, each of the image-forming elements 301D, 301E, and 301F in row 302B may be updated less frequently than those in row 302A. Thus, during a particular refresh cycle, output buffer 314B may be controlled based at least in part on the output enable signal to prevent the clock signal from propagating to the image-forming elements of row 302B. In this manner, the image-forming elements are not updated during that refresh cycle, and thus do not consume unnecessary electrical power.

It will be understood that these strategies may be employed to establish any suitable number and variety of different display regions, each including image-forming elements that are updated at different refresh rates. Each display region may have any suitable size, shape, and position with respect to the overall display area. As one non-limiting example, one display region may be used for video content that updates frequently, and thus image-forming elements in that region may be updated at a high refresh rate (e.g., 60 Hz, 120 Hz). By contrast, another display region may be used for visual content (such as text) that updates less frequently, and thus image-forming elements in that region may be updated at a lower refresh rate (e.g., 30 Hz, 10 Hz). Similarly, a portion of the display used for content that rarely if ever updates (such as a static background image) may be updated at a low refresh rate, such as 1 Hz. This can contribute to substantial power savings as compared to implementations where each row of image-forming elements is updated on every refresh cycle, regardless of changes in the image content that the display is used to present.

In the example of FIG. 3, each image-forming element has one corresponding selector component that controls whether the image-forming element is updated, as influenced by the output enable signal and block selection signal. However, this configuration is non-limiting. In some examples, each image-forming element may be associated with two or more respective selector components.

Figure 4:
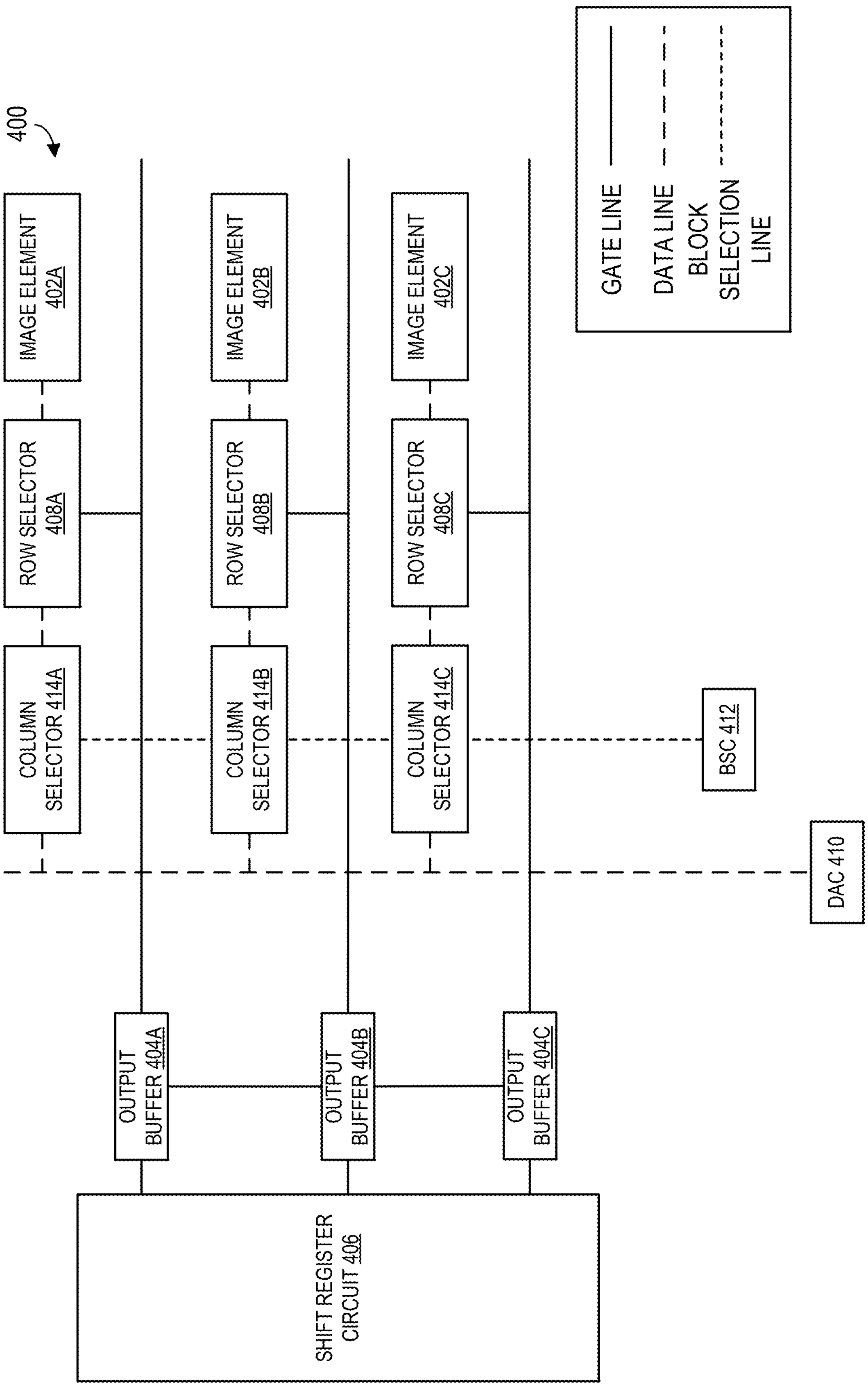
FIG. 4 schematically illustrates another example display device configuration.

One such example is schematically illustrated with respect to FIG. 4, showing aspects of another example display device 400 including a plurality of image-forming elements 402A, 402B, and 402C. These are coupled with corresponding output buffers 404A, 404B, and 404C, which receive clock signals from a shift register circuit 406. The output buffers may be controlled based at least in part on the state of an output enable signal, as discussed above.

In this example, however, each image-forming element is associated with a respective row selector 408A-408C, which receives clock signals output by the output buffers. As a result, when the output selection signal enables a given output buffer, the downstream row selector receives the clock signals from that output buffer. This causes the row selector to pass along any data signals received from a corresponding column selector to the image-forming element, enabling the image-forming element to update based at least in part on the data signals. By contrast, if a given output buffer is disabled by the output selection signal, then the downstream row selector does not receive the clock signals. Thus, the row selector does not pass along data signals from the column selector, and thereby prevents is associated image-forming element from updating.

Similarly, in FIG. 4, the display device includes a DAC 410 which outputs data signals. A block selection component 412 outputs a block selection signal that influences whether the image-forming elements are refreshed based at least in part on the data signals. Specifically, as shown, each image-forming element is additionally associated with respective column selectors 414A-C, which receive both the data signals from DAC 410 and the block selection signal from block selection component 412. For a given column selector, when the block selection signal is active, then the column selector passes the data signals to the downstream row selector. When the block selection signal is inactive, then the column selector does not pass the data signals to the row selector, thereby preventing the image-forming element from updating. In this manner, by controlling the output enable signal and block selection signal, it is possible to control the rates at which different image-forming elements are updated.

Figure 5:
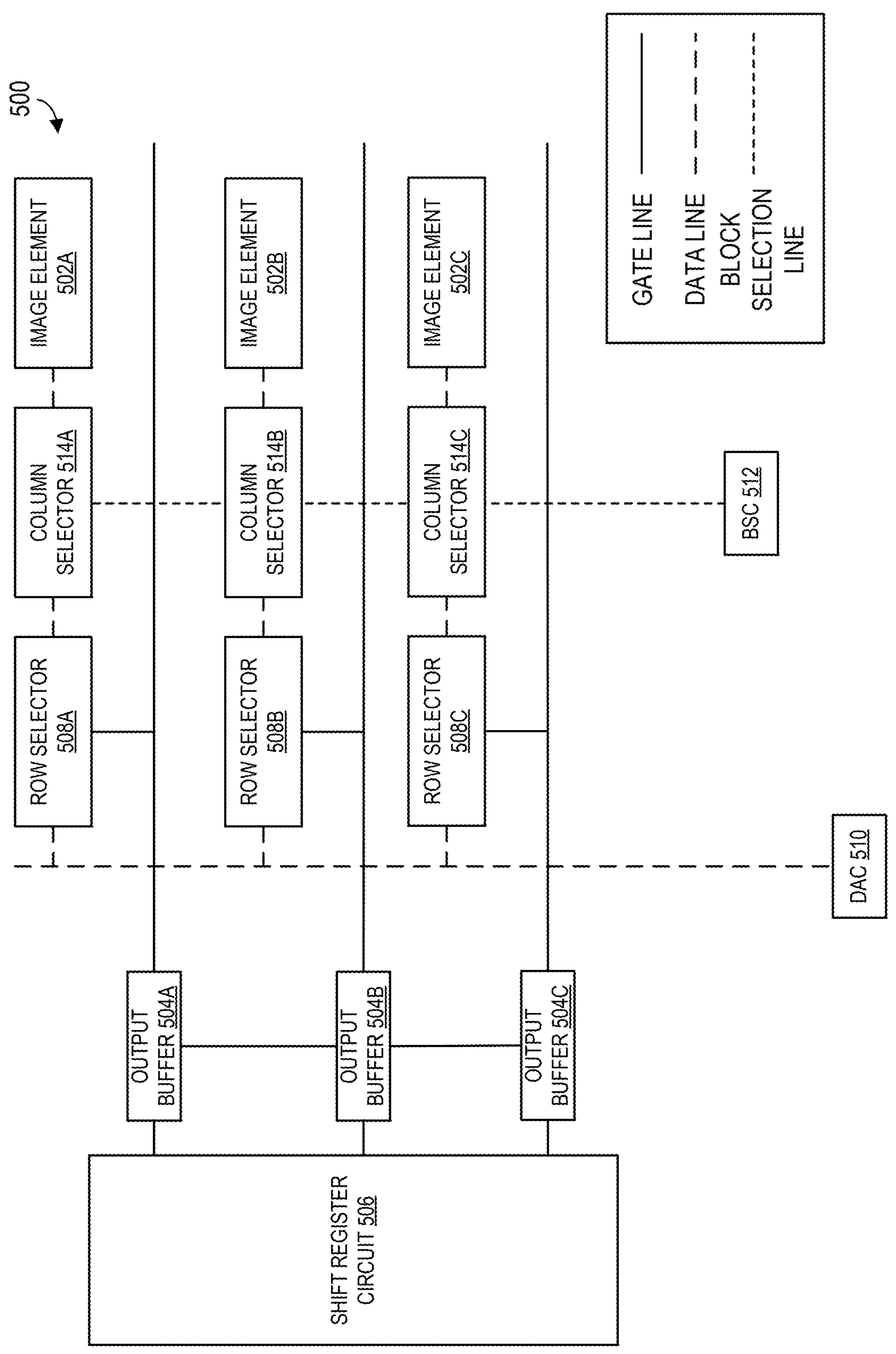
FIG. 5 schematically illustrates another example display device configuration.

In this example, the row selectors are positioned between the column selectors and the image-forming elements. However, this is non-limiting. FIG. 5 schematically depicts aspects of another example display device 500 including a plurality of image-forming elements 502A, 502B, and 502C. These are coupled with corresponding output buffers 504A, 504B, and 504C, which receive clock signals from a shift register circuit 506. Each image-forming element has an associated row selector 508A-C.

Additionally, display device 500 includes a DAC 510 which outputs data signals. A block selection component 512 outputs a block selection signal that controls whether the image-forming elements are updated in response to the data signals. This is determined at least in part by column selectors 514A-C. The row and column selectors may function substantially as described above with respect to FIG. 4. However, in this example, the column selectors are positioned between the row selectors and the image-forming elements.

In the examples described thus far, each column of image-forming elements has its own respective block selection component. However, as discussed above, this need not be the case. In other examples, the same block selection component may be used to control image-forming elements in two or more adjacent columns. This can reduce the cost and complexity of manufacturing the display device, while still enabling the block selection and refresh rate control techniques described herein.

Figure 6:
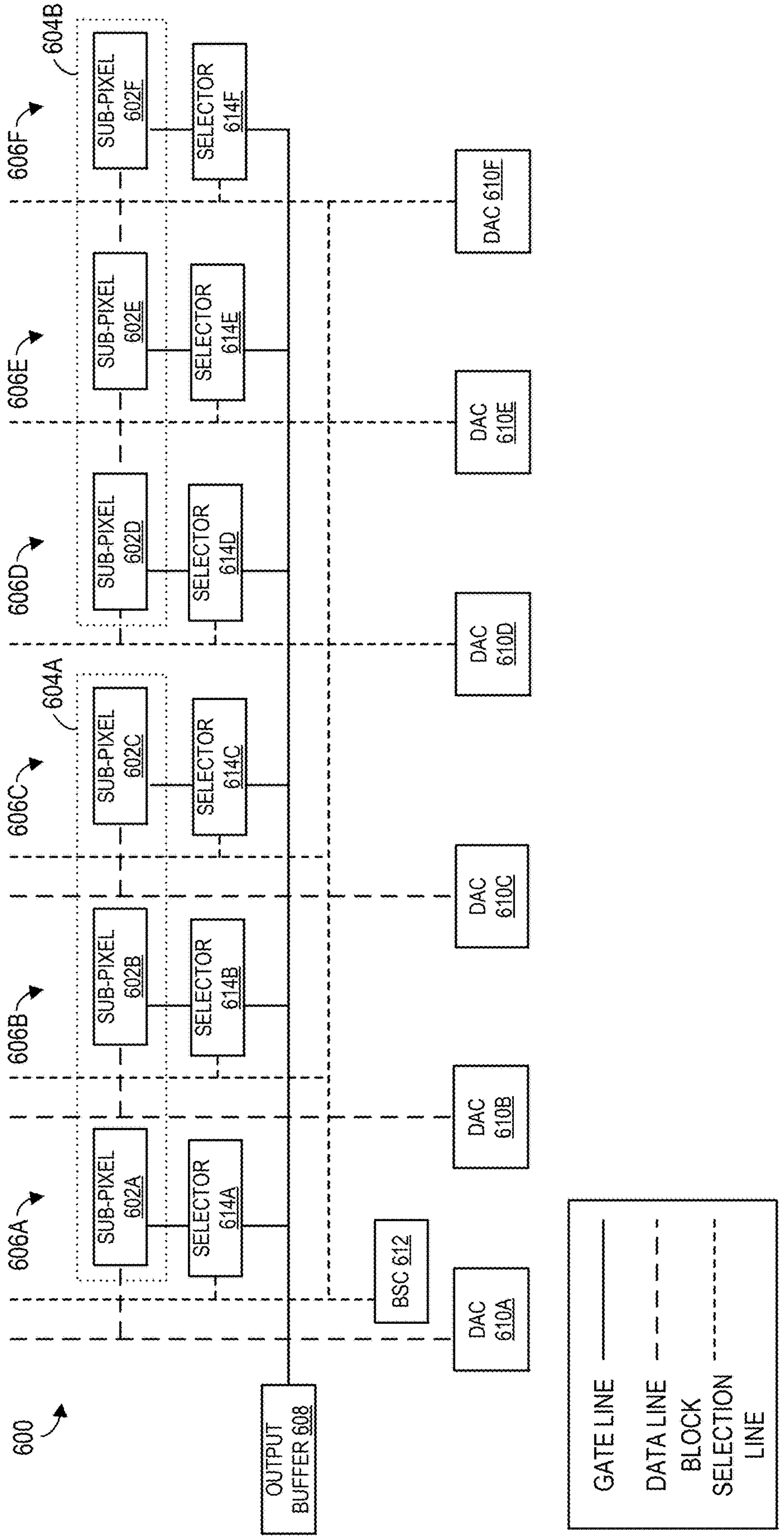
FIG. 6 schematically illustrates an arrangement of sub-pixels in which a block selection component controls multiple columns of sub-pixels.

One such configuration is schematically illustrated with respect to FIG. 6. Specifically, FIG. 6 schematically depicts aspects of another example display device 600. In this example, the image-forming elements take the form of sub-pixels, such that display device 600 includes a plurality of sub-pixels 602A-602C. The sub-pixels collectively comprise a plurality of pixels, such that two or more sub-pixels arranged in two or more adjacent columns collectively form a pixel. For instance, the sub-pixels may correspond to red, green, and blue sub-pixels of the larger pixels. In this example, adjacent sub-pixels 602A, 602B, and 602C form a pixel 604A, while adjacent sub-pixels 602D, 602E, and 602F collectively form a pixel 604B. For the sake of visual clarity, FIG. 6 only depicts one row of sub-pixels, which are arranged into six columns 606A-606F. However, it will be understood that the display device may include any suitable number of rows and columns of image-forming elements, depending on the resolution of the display device. This sub-pixel arrangement may beneficially enable more precise control over color rendering and brightness levels by allowing independent modulation of each color component within a pixel. As a result, the display device can achieve improved color accuracy and higher overall image fidelity.

FIG. 6 additionally depicts an output buffer 608, which is configured to output clock signals to the gate line to thereby activate the plurality of sub-pixels. As discussed above, the output buffer may be selectively enabled based at least in part on the state of an output enable signal. Display device 600 additionally includes a plurality of DACs 610A-610F associated with a source IC. These DACs output data signals to each column of sub-pixels. Thus, when the clock signal is active, the sub-pixels read the data signals on their corresponding columns and update their state, as discussed above.

Furthermore, display device 600 includes at least one block selection component 612 that controls, via a block selection signal, whether the sub-pixels are refreshed. For instance, as discussed above, each sub-pixel is associated with a corresponding selector 614A-F, which is affected by the state of the block selection signal. In this manner, a particular sub-pixel is only refreshed when the clock signal and block selection signal are both active.

Unlike the scenario depicted in FIG. 3, in this example, two or more adjacent columns of sub-pixels are controlled by the same block selection component. In other words, adjacent sub-pixels 602A, 602B, and 602C comprising the same pixel 604A are each controlled by the same block selection component 612. Furthermore, in this example, the two adjacent pixels 604A and 604B are each controlled by the same block selection component. In other words, block selection component 612 controls whether both of the pixels 604A and 604B are refreshed based at least in part on the data signals from the source IC. The block selection component may have any suitable position with respect to the grid of image-forming elements. For instance, in another example arrangement, the block selection component could be moved to a position between DACs 610C and 610D, or another suitable position.

It will be understood that, in other examples, any suitable number of block selection components may be used, and the block selection components may be arranged in any suitable way, to thereby enable refresh rate control with any suitable degree of spatial granularity. For instance, as is shown in FIG. 3, a display device may in some cases include separate block selection components for each column of image-forming elements. In some examples, two or more sub-pixels of the same pixel may be controlled by the same block selection component. In some examples, two or more adjacent pixels of the display device may be controlled by the same block selection component. Such arrangements may enable substantial manufacturing savings by reducing the cost and complexity of the display device, while still allowing for different display regions that are updated at different refresh rates.

Figure 7:
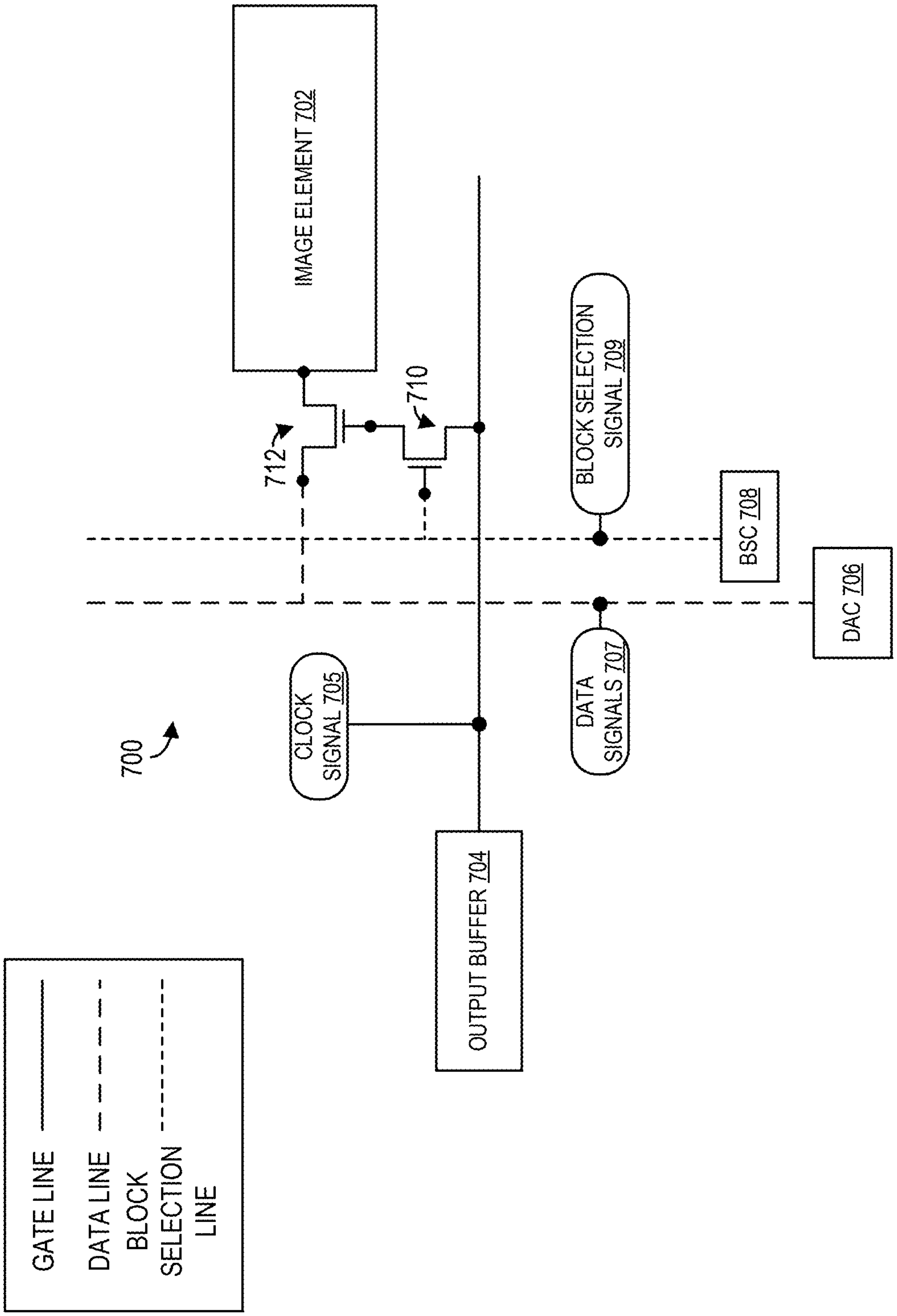
FIG. 7 schematically illustrates an example arrangement of transistors to control whether an image-forming element of a display device is refreshed.
Figure 8:
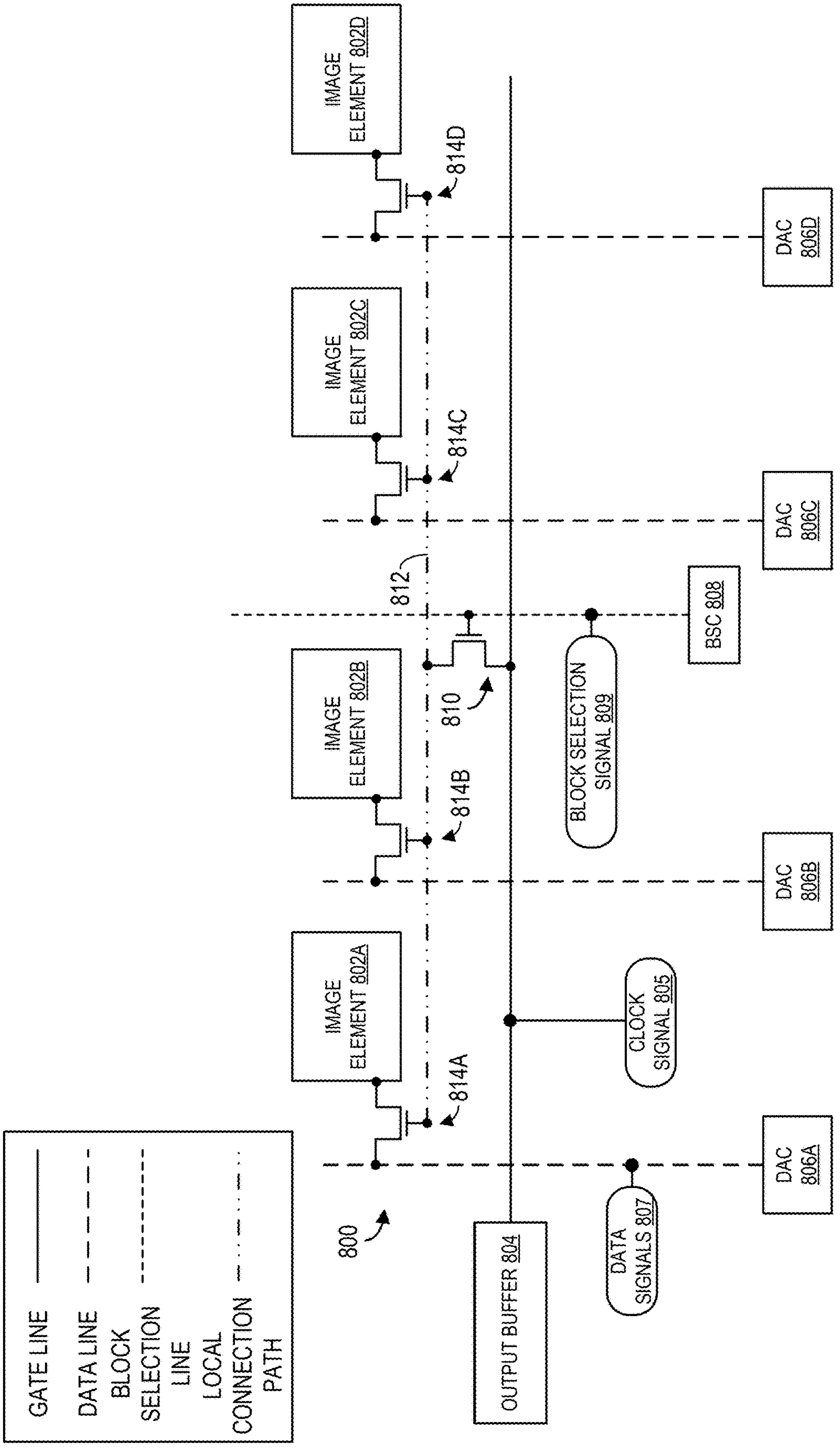
FIG. 8 schematically illustrates an example arrangement in which multiple image-forming elements are connected via a local connection path.

FIGS. 7 and 8 illustrate example hardware arrangements for implementing the selector components described above with respect to FIGS. 3-6. Specifically, FIG. 7 shows aspects of another example display device 700, including at least one image-forming element 702. This is operatively coupled with an output buffer 704 via a gate line. As discussed above, the output buffer may be controlled based at least in part on the state of an output enable signal, to thereby determine whether the output buffer outputs a clock signal 705 to the image-forming element. Additionally, a DAC 706 associated with a source IC outputs data signals 707. A block selection component 708 outputs a block selection signal 709 that determines whether the image-forming element is refreshed based at least in part on the data signals 707.

In this example, a set of two transistors 710 and 712 (i.e., a "first transistor" and a "second transistor") are used to function as a selector component described above with respect to FIGS. 3-6. In other words, these transistors control whether the image-forming element is refreshed, based at least in part on the state of the clock signal and the block selection signal. The first and second transistors may be implemented in any suitable way, such as using thin-film transistors (TFTs).

As shown, first transistor 710 receives the clock signal 705 from the gate IC (e.g., by way of output buffer 704), and receives the block selection signal 709 from the block selection component. The first transistor passes the clock signal to the second transistor based at least in part on the block selection signal being active. Second transistor 712 receives the data signals from the source IC (e.g., by way of DAC 706), and passes the data signals to image-forming element 702 based at least in part on receiving the clock signal from the first transistor. In this manner, the image-forming element only receives the data signal if both the clock signal and block selection signal are active, meaning the refresh rate of the image-forming component can be controlled by controlling the output enable signal and block selection signal, as discussed above.

Turning now to FIG. 8, another example transistor arrangement is schematically illustrated. Specifically, FIG. 8 schematically shows aspects of another example display device 800, including a plurality of image-forming elements

802A-802D. An output buffer 804 may be controlled based at least in part on the state of an output enable signal, to thereby determine whether a clock signal 805 is output by the output buffer. A plurality of DACs 806A-806D respectively corresponding to each column of image-forming elements output data signals 807 for each column. Additionally, a block selection component 808 outputs a block selection signal 809 that determines whether the image-forming elements are refreshed based at least in part on the data signals.

In this example, the display device includes a first transistor 810 that receives the clock signal from the gate IC (e.g., by way of output buffer 804), and receives the block selection signal from the block selection component. Based at least in part on the block selection signal being active, the first transistor passes the clock signal to a local connection path 812 that connects a local subset of the image-forming elements of the display device. In the simplified example of FIG. 8, each of the depicted image-forming elements are part of this local subset and connected via the local connection path. It will be understood that, in other examples, the display device may include a plurality of different local subsets of image-forming elements, each connected via their own respective local connection paths.

In FIG. 8, each image-forming element of the local subset is connected to the local connection path via a respective second transistor 814A-814D. Each respective second transistor receives the data signals from the source IC (e.g., by way of its corresponding DAC 806), and passes the data signals to its corresponding image-forming element based at least in part on receiving the clock signals from the local connection path. In this manner, the local subset of image-forming elements are only refreshed if both the clock signal and block selection signal are active, meaning the refresh rate for the block of image-forming elements can be controlled by controlling the output enable signal and block selection signal.

Figure 9:
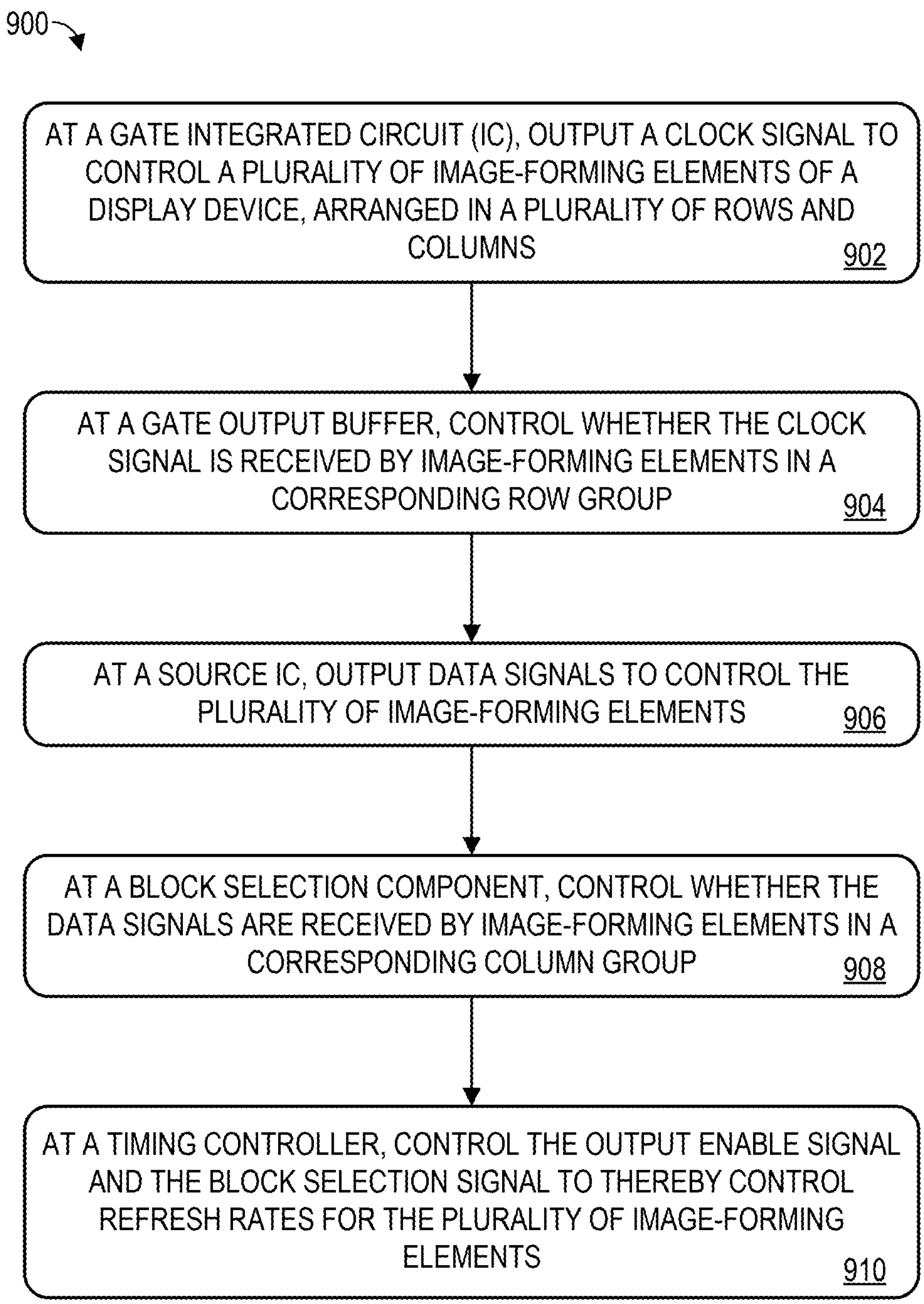
FIG. 9 illustrates an example method for controlling a display device.

FIG. 9 illustrates an example method 900 for controlling a display device. Steps of method 900 may be implemented using any suitable hardware of a display device and/or computing device. Steps of method 900 be initiated, terminated, and/or repeated at any suitable time and in response to any suitable condition. In some examples, method 900 may be implemented by, or in tandem with, computing system 1000 described below with respect to FIG. 10.

At 902, method 900 includes, at a gate integrated circuit (IC), outputting a clock signal to control a plurality of image-forming elements of a display device, wherein the plurality of image-forming elements are arranged in a grid that includes a plurality of rows and a plurality of columns. The clock signal is sequentially applied to a set of row lines, each of which is electrically coupled to a respective row of image-forming elements. When a given row line receives the clock signal, the image-forming elements in that row may become active, allowing them to receive and store data signals present on the column lines. After the data signals have been written to the active row, the clock signal transitions to the next row line, thereby progressing through the display grid in a row-by-row fashion. This process continues in accordance with a refresh cycle determined by the timing controller or other control circuitry.

At 904, method 900 includes, at a gate output buffer, controlling, based at least in part on an output enable signal being active, whether the clock signal is received by image-forming elements in a corresponding row group including one or more rows of the plurality of rows. The output enable signal may be generated by a timing controller or other suitable control component, and may selectively activate or deactivate the output buffer associated with the row group. When the output enable signal is active, the output buffer allows the clock signal to pass through to the row line(s), thereby enabling the image-forming elements in the row group to receive data signals and update their display state. Conversely, when the output enable signal is inactive, the output buffer suppresses the clock signal, preventing the associated row group from being refreshed during that cycle. This selective gating allows the display system to update specific regions of the panel while leaving others unchanged, which can reduce power consumption and improve system efficiency.

At 906, method 900 includes, at a source IC, outputting data signals to control the plurality of image-forming elements. The source IC receives image data from a timing controller or other upstream component and converts the data into corresponding electrical signals that are driven onto a set of column lines extending across the display panel. Each column line corresponds to a vertical sequence of image-forming elements, and the data signals applied to these lines define the target display state, such as brightness, color, or grayscale level, of the image-forming elements located at the intersection of the active row and the respective column. The timing of these data signals is synchronized with the row-scanning operation controlled by the gate IC, such that the appropriate data is present on the column lines when the corresponding row is enabled.

At 908, method 900 includes, at a block selection component, controlling, via a block selection signal, whether image-forming elements in a corresponding column group including one or more columns of the plurality of columns are refreshed based at least in part on the data signals. The block selection component receives the block selection signal from a timing controller or other suitable control circuit and propagates its state along an additional trace that extends along the relevant column group. When the block selection signal is active, the block selection component enables the image-forming elements in the associated column group to respond to the data signals present on the column lines during the active row interval. Conversely, when the block selection signal is inactive, the image-forming elements in the column group are inhibited from updating, such that their previously stored state is maintained. This selective column-wise gating allows fine-grained control over which portions of the display panel are refreshed in a given cycle, thereby enabling region-specific updates and reducing power consumption for static areas of the display.

At 910, method 900 includes, at a timing controller, controlling the output enable signal and the block selection signal to thereby control refresh rates for the plurality of image-forming elements. In this manner, the display device may establish a first display region including a first subset of image-forming elements that are refreshed at a first refresh rate, and a second display region including a second subset of image-forming elements that are refreshed at a second refresh rate. The timing controller may determine the applicable refresh rate for each region based at least in part on display content, power management settings, and/or other system-level considerations. By selectively activating output enable signals and block selection signals in accordance with the assigned refresh schedules, the timing controller can ensure that different portions of the display are updated at different refresh rates. This may include, for example, refreshing dynamic content regions, such as video playback areas, at a higher rate, while maintaining static regions, such as status bars or background elements, at a lower rate. Such differentiated refresh control may reduce overall power consumption without adversely impacting user-perceived display quality.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 10:
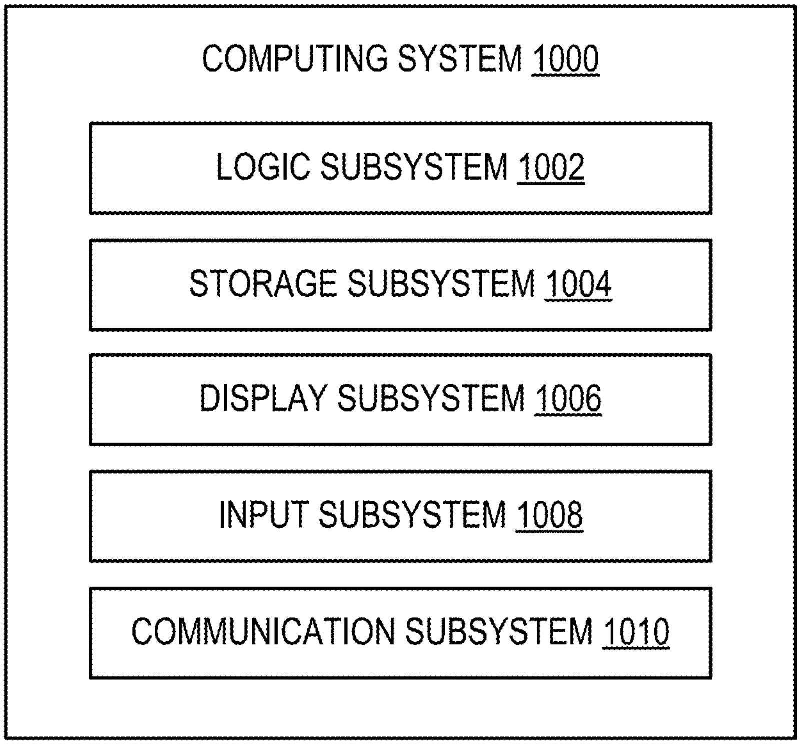
FIG. 10 schematically shows an example computing system.

FIG. 10 schematically shows a simplified representation of a computing system 1000 configured to provide any to all of the compute functionality described herein. Computing system 1000 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1000 includes a logic subsystem 1002 and a storage subsystem 1004. Computing system 1000 may optionally include a display subsystem 1006, input subsystem 1008, communication subsystem 1010, and/or other subsystems not shown in FIG. 10.

Logic subsystem 1002 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1004 includes one or more physical devices configured to temporarily and/or permanently hold computer information such as data and instructions executable by the logic subsystem. When the storage subsystem includes two or more devices, the devices may be collocated and/or remotely located. Storage subsystem 1004 may include volatile, nonvolatile, dynamic, static, read/write, read-only, random-access, sequential-access, location-addressable, file-addressable, and/or content-addressable devices. Storage subsystem 1004 may include removable and/or built-in devices. When the logic subsystem executes instructions, the state of storage subsystem 1004 may be transformed—e.g., to hold different data.

Aspects of logic subsystem 1002 and storage subsystem 1004 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 1006 may be used to present a visual representation of data held by storage subsystem 1004. This visual representation may take the form of a graphical user interface (GUI). Display subsystem 1006 may include one or more display devices utilizing virtually any type of technology. In some implementations, display subsystem may include one or more virtual-, augmented-, or mixed reality displays.

When included, input subsystem 1008 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1010 may be configured to communicatively couple computing system 1000 with one or more other computing devices. Communication subsystem 1010 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a display device comprises: a plurality of image-forming elements arranged in a grid, wherein the grid includes a plurality of rows and a plurality of columns; a gate integrated circuit (IC) configured to output a clock signal to control the plurality of image-forming elements; a gate output buffer configured to control, based at least in part on an output enable signal being active, whether the clock signal is received by image-forming elements in a corresponding row group including one or more rows of the plurality of rows; a source IC configured to output data signals to control the plurality of image-forming elements; a block selection component configured to control, via a block selection signal, whether image-forming elements in a corresponding column group including one or more columns of the plurality of columns are refreshed based at least in part on the data signals; and a timing controller configured to control the output enable signal and the block selection signal to thereby control refresh rates for the plurality of image-forming elements, such that a first display region including a first subset of image-forming elements is refreshed at a first refresh rate, and a second display region including a second subset of image-forming elements is refreshed at a second refresh rate. In this example or any other example, the gate output buffer is one of a plurality of gate output buffers, and the corresponding row group includes one row, such that each row of the plurality of rows is associated with a respective gate output buffer of the plurality of gate output buffers. In this example or any other example, the block selection component is one of a plurality of block selection components, and the corresponding column group includes one column, such that each column of the plurality of columns is associated with a respective block selection component of the plurality of block selection components. In this example or any other example, the plurality of block selection components are subcomponents of the source IC. In this example or any other example, the plurality of image-forming elements are sub-pixels of a plurality of pixels, wherein a pixel of the plurality of pixels comprises two or more sub-pixels arranged in two or more adjacent columns of the plurality of columns, and wherein the block selection component controls whether the two or more sub-pixels are refreshed based at least in part on the data signals from the source IC. In this example or any other example, the plurality of pixels include two adjacent pixels, and wherein the block selection component controls whether each of the two adjacent pixels are refreshed based at least in part on the data signals from the source IC. In this example or any other example, the display device further comprises a first transistor and a second transistor, wherein the first transistor receives the clock signal from the gate IC and the block selection signal from the block selection component, and passes the clock signal to a second transistor based at least in part on the block selection signal being active, and wherein the second transistor receives the data signals from the source IC, and passes the data signals to an image-forming element of the plurality of image-forming elements based at least in part on receiving the clock signal from the first transistor. In this example or any other example, the display device further comprises a first transistor that receives the clock signal from the gate IC and the block selection signal from the block selection component, and based at least in part on the block selection signal being active, passes the clock signal to a local connection path that connects a local subset of image-forming elements of the plurality of image-forming elements. In this example or any other example, each image-forming element of the local subset is connected to the local connection path via a respective second transistor, and wherein each respective second transistor receives the data signals from the source IC, and passes the data signals to its corresponding image-forming element based at least in part on receiving the clock signal from the local connection path. In this example or any other example, the display device further comprises a level shifter configured to increase a voltage of the block selection signal. In this example or any other example, the plurality of image-forming elements are pixels of an active-matrix display. In this example or any other example, the active-matrix display is selected from a group including a liquid crystal display (LCD) and an organic light emitting diode (OLED) display.

In an example, a method for controlling a display device comprises: at a gate integrated circuit (IC), outputting a clock signal to control a plurality of image-forming elements of a display device, wherein the plurality of image-forming elements are arranged in a grid that includes a plurality of rows and a plurality of columns; at a gate output buffer, controlling, based at least in part on an output enable signal being active, whether the clock signal is received by image-forming elements in a corresponding row group including one or more rows of the plurality of rows; at a source IC, outputting data signals to control the plurality of image-forming elements; at a block selection component, controlling, via a block selection signal, whether image-forming elements in a corresponding column group including one or more columns of the plurality of columns are refreshed based at least in part on the data signals; and at a timing controller, controlling the output enable signal and the block selection signal to thereby control refresh rates for the plurality of image-forming elements, such that a first display region including a first subset of image-forming elements is refreshed at a first refresh rate, and a second display region including a second subset of image-forming elements is refreshed at a second refresh rate. In this example or any other example, the gate output buffer is one of a plurality of gate output buffers, and the corresponding row group includes one row, such that each row of the plurality of rows is associated with a respective gate output buffer of the plurality of gate output buffers. In this example or any other example, the plurality of image-forming elements are sub-pixels of a plurality of pixels, wherein a pixel of the plurality of pixels comprises two or more sub-pixels arranged in two or more adjacent columns of the plurality of columns, and wherein the block selection component controls whether the two or more sub-pixels are refreshed based at least in part on the data signals from the source IC. In this example or any other example, the plurality of pixels include two adjacent pixels, and wherein the block selection component controls whether each of the two adjacent pixels are refreshed based at least in part on the data signals from the source IC. In this example or any other example, the display device further comprises a first transistor and a second transistor, wherein the first transistor receives the clock signal from the gate IC and the block selection signal from the block selection component, and passes the clock signal to a second transistor based at least in part on the block selection signal being active, and wherein the second transistor receives the data signals from the source IC and passes the data signals to an image-forming element of the plurality of image-forming elements based at least in part on receiving the clock signal from the first transistor. In this example or any other example, the display device further comprises a first transistor that receives the clock signal from the gate IC and the block selection signal from the block selection component, and based at least in part on the block selection signal being active, passes the clock signal to a local connection path that connects a local subset of image-forming elements of the plurality of image-forming elements. In this example or any other example, each image-forming element of the local subset is connected to the local connection path via a respective second transistor, and wherein each respective second transistor receives the data signals from the source IC, and passes the data signals to its corresponding image-forming element based at least in part on receiving the clock signal from the local connection path.

In an example, a computing device comprises: a processing component configured to output imagery for display; and a display device configured to display the imagery output by the processing component, the display device comprising: a plurality of image-forming elements arranged in a grid, wherein the grid includes a plurality of rows and a plurality of columns; a gate integrated circuit (IC) configured to output a clock signal to control the plurality of image-forming elements; a gate output buffer configured to control, based at least in part on an output enable signal being active, whether the clock signal is received by image-forming elements in a corresponding row group including two or more rows of the plurality of rows; a source IC configured to output data signals to control the plurality of image-forming elements; a block selection component configured to control, via a block selection signal, whether image-forming elements in a corresponding column group including two or more columns of the plurality of columns are refreshed based at least in part on the data signals; and a timing controller configured to control the output enable signal and the block selection signal to thereby control refresh rates for the plurality of image-forming elements, such that a first display region including a first subset of image-forming elements is refreshed at a first refresh rate, and a second display region including a second subset of image-forming elements is refreshed at a second refresh rate.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device, comprising:

a plurality of image-forming elements arranged in a grid, wherein the grid includes a plurality of rows and a plurality of columns;

a gate integrated circuit (IC) configured to output a clock signal to control the plurality of image-forming elements;

a gate output buffer configured to control, based at least in part on an output enable signal being active, whether the clock signal is received by image-forming elements in a corresponding row group including one or more rows of the plurality of rows;

a source IC configured to output data signals to control the plurality of image-forming elements;

a plurality of block selection components, each block selection component configured to control, via a respective block selection signal, whether image-forming elements in a corresponding column group including one or more columns of the plurality of columns are refreshed based at least in part on the data signals, wherein each block selection component is configured to propagate a state of its respective block selection signal through a corresponding trace extending along the corresponding column group; and a timing controller configured to control the output enable signal and each respective block selection signal to thereby control refresh rates for the plurality of image-forming elements, such that a first display region including a first subset of image-forming elements is refreshed at a first refresh rate, and a second display region including a second subset of image-forming elements is refreshed at a second refresh rate.

2. The display device of claim 1, wherein the gate output buffer is one of a plurality of gate output buffers, and the corresponding row group includes one row, such that each row of the plurality of rows is associated with a respective gate output buffer of the plurality of gate output buffers.

3. The display device of claim 1, wherein the corresponding column group includes one column, such that each column of the plurality of columns is associated with a respective block selection component of the plurality of block selection components.

4. The display device of claim 3, wherein the plurality of block selection components are subcomponents of the source IC.

5. The display device of claim 1, wherein the plurality of image-forming elements are sub-pixels of a plurality of pixels, wherein a pixel of the plurality of pixels comprises two or more sub-pixels arranged in two or more adjacent columns of the plurality of columns, and wherein a respective block selection component of the plurality of block selection components controls whether the two or more sub-pixels are refreshed based at least in part on the data signals from the source IC.

6. The display device of claim 5, wherein the plurality of pixels include two adjacent pixels, and wherein the respective block selection component controls whether each of the two adjacent pixels are refreshed based at least in part on the data signals from the source IC.

7. The display device of claim 1, further comprising a first transistor and a second transistor, wherein the first transistor receives the clock signal from the gate IC and receives, from a block selection component of the plurality of block selection components, the respective block selection signal from the block selection component, and passes the clock signal to a second transistor based at least in part on the respective block selection signal being active, and wherein the second transistor receives the data signals from the source IC, and passes the data signals to an image-forming element of the plurality of image-forming elements based at least in part on receiving the clock signal from the first transistor.

8. The display device of claim 1, further comprising a first transistor that receives the clock signal from the gate IC and receives, from a block selection component of the plurality of block selection components, the respective block selection signal from the block selection component, and based at least in part on the respective block selection signal being active, passes the clock signal to a local connection path that connects a local subset of image-forming elements of the plurality of image-forming elements.

9. The display device of claim 8, wherein each image-forming element of the local subset is connected to the local connection path via a respective second transistor, and wherein each respective second transistor receives the data signals from the source IC, and passes the data signals to its corresponding image-forming element based at least in part on receiving the clock signal from the local connection path.

10. The display device of claim 1, further comprising a level shifter configured to increase a voltage of each respective block selection signal.

11. The display device of claim 1, wherein the plurality of image-forming elements are pixels of an active-matrix display.

12. The display device of claim 11, wherein the active-matrix display is selected from a group including a liquid crystal display (LCD) and an organic light emitting diode (OLED) display.

13. A method for controlling a display device, the method comprising:

at a gate integrated circuit (IC), outputting a clock signal to control a plurality of image-forming elements of a display device, wherein the plurality of image-forming elements are arranged in a grid that includes a plurality of rows and a plurality of columns;

at a gate output buffer, controlling, based at least in part on an output enable signal being active, whether the clock signal is received by image-forming elements in a corresponding row group including one or more rows of the plurality of rows;

at a source IC, outputting data signals to control the plurality of image-forming elements;

at a block selection component of a plurality of block selection components, controlling, via a respective block selection signal, whether image-forming elements in a corresponding column group including one or more columns of the plurality of columns are refreshed based at least in part on the data signals, wherein each block selection component is configured to propagate a state of its respective block selection signal through a corresponding trace extending along the corresponding column group; and at a timing controller, controlling the output enable signal and each respective block selection signal to thereby control refresh rates for the plurality of image-forming elements, such that a first display region including a first subset of image-forming elements is refreshed at a first refresh rate, and a second display region including a second subset of image-forming elements is refreshed at a second refresh rate.

14. The method of claim 13, wherein the gate output buffer is one of a plurality of gate output buffers, and the corresponding row group includes one row, such that each row of the plurality of rows is associated with a respective gate output buffer of the plurality of gate output buffers.

15. The method of claim 13, wherein the plurality of image-forming elements are sub-pixels of a plurality of pixels, wherein a pixel of the plurality of pixels comprises two or more sub-pixels arranged in two or more adjacent columns of the plurality of columns, and wherein a respective block selection component of the plurality of block selection components controls whether the two or more sub-pixels are refreshed based at least in part on the data signals from the source IC.

16. The method of claim 15, wherein the plurality of pixels include two adjacent pixels, and wherein the respective block selection component controls whether each of the two adjacent pixels are refreshed based at least in part on the data signals from the source IC.

17. The method of claim 13, wherein the display device further comprises a first transistor and a second transistor, wherein the first transistor receives the clock signal from the gate IC and receives, from a block selection component of the plurality of block selection components, the respective block selection signal from the block selection component, and passes the clock signal to a second transistor based at least in part on the respective block selection signal being active, and wherein the second transistor receives the data signals from the source IC and passes the data signals to an image-forming element of the plurality of image-forming elements based at least in part on receiving the clock signal from the first transistor.

18. The method of claim 13, wherein the display device further comprises a first transistor that receives the clock signal from the gate IC and receives, from a block selection component of the plurality of block selection components, the respective block selection signal from the block selection component, and based at least in part on the respective block selection signal being active, passes the clock signal to a local connection path that connects a local subset of image-forming elements of the plurality of image-forming elements.

19. The method of claim 18, wherein each image-forming element of the local subset is connected to the local connection path via a respective second transistor, and wherein each respective second transistor receives the data signals from the source IC, and passes the data signals to its corresponding image-forming element based at least in part on receiving the clock signal from the local connection path.

20. A computing device, comprising:

a processing component configured to output imagery for display; and a display device configured to display the imagery output by the processing component, the display device comprising:

a plurality of image-forming elements arranged in a grid, wherein the grid includes a plurality of rows and a plurality of columns;

a gate integrated circuit (IC) configured to output a clock signal to control the plurality of image-forming elements;

a gate output buffer configured to control, based at least in part on an output enable signal being active, whether the clock signal is received by image-forming elements in a corresponding row group including two or more rows of the plurality of rows;

a source IC configured to output data signals to control the plurality of image-forming elements;

a plurality of block selection components, each block selection component configured to control, via a respective block selection signal, whether image-forming elements in a corresponding column group including two or more columns of the plurality of columns are refreshed based at least in part on the data signals, wherein each block selection component is configured to propagate a state of its respective block selection signal through a corresponding trace extending along the corresponding column group; and a timing controller configured to control the output enable signal and each respective block selection signal to thereby control refresh rates for the plurality of image-forming elements, such that a first display region including a first subset of image-forming elements is refreshed at a first refresh rate, and a second display region including a second subset of image-forming elements is refreshed at a second refresh rate.

* * * * *